UNITED STATES PATENT OFFICE.

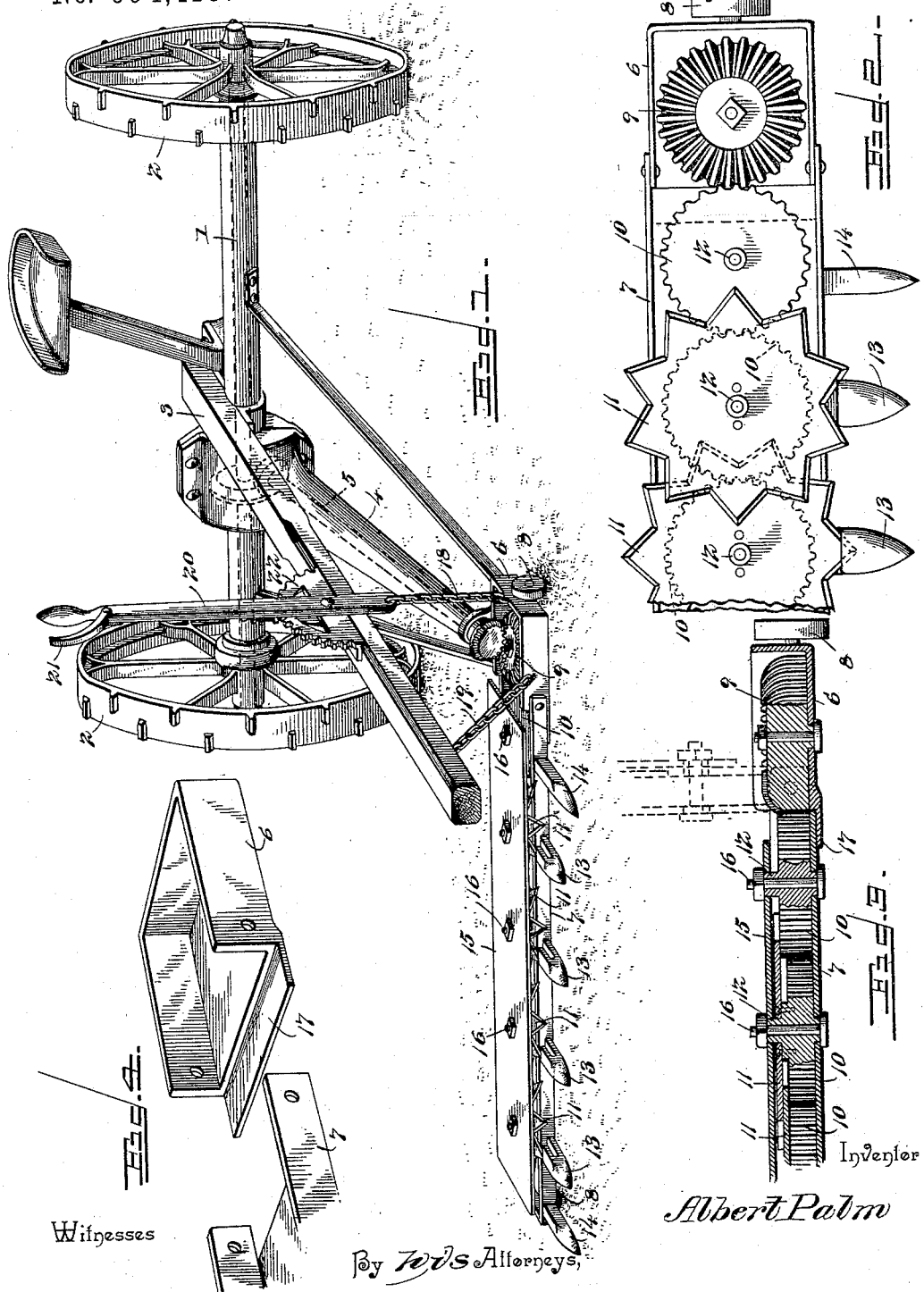

ALBERT PALM, OF STERLING, ILLINOIS.

CUTTING APPARATUS.

SPECIFICATION forming part of Letters Patent No. 604,413, dated May 24, 1898.

Application filed October 4, 1897. Serial No. 653,964. (No model.)

*To all whom it may concern:*

Be it known that I, ALBERT PALM, a citizen of the United States, residing at Sterling, in the county of Whiteside and State of Illinois, have invented a new and useful Cutting Apparatus, of which the following is a specification.

This invention relates to mowers, and more particularly to the cutting apparatus, whereby the same is enabled to be readily folded when the mower is not in active service or is being moved from place to place.

The improved cutting apparatus is adapted for mowers, reapers, harvesters, and like implements for cutting grain and is of the rotary type.

For a full understanding of the merits and advantages of the invention reference is to be had to the accompanying drawings and the following description.

The improvement is susceptible of various changes in the form, proportion, and minor details of construction without departing from the principle or sacrificing any of the advantages thereof, and to a full disclosure of the invention an adaptation thereof is shown in the accompanying drawings, in which—

Figure 1 is a perspective view of a mower having the improved cutting apparatus in position. Fig. 2 is a top plan view of the cutting apparatus, a portion of the casing being broken away and the cover omitted. Fig. 3 is a longitudinal section of the cutting apparatus, parts being broken away, and indicating by dotted lines the folded position of the pivoted casing when the cutting apparatus is not in action. Fig. 4 is a detail view in perspective of the contiguous ends of the inner and outer parts of the casing, showing them separated.

Corresponding and like parts are referred to in the following description and indicated in the several views of the drawings by the same reference characters.

The mower, as illustrated, comprises an axle 1, ground-wheels 2, tongue 3, frame 4, and shaft 5 for transmitting motion from the axle to the cutting apparatus.

A casing is secured to the lower forward end of the frame 4 and supports the parts comprising the cutting mechanism and is composed of an inner part 6 and an outer part 7, hinged or pivoted together, whereby the outer part 7 is adapted to be elevated slightly at its outer or free end, so as to clear hillocks, stumps, and like obstructions, and to fold or be turned up out of the way when the mower is not in use. Ground-wheels 8 are located at the ends of the casing to support it when the mower is traveling over the field. The inner part 6 of the casing contains a primary gear-wheel 9, which receives motion directly from the shaft 5 and by means of which power is transmitted to the series of rotary cutters in the manner presently to be described.

The rotary cutters comprise two parts, a gear-wheel 10 and a star or pointed cutter 11, which are secured together in any substantial manner. The gear-wheels 10 intermesh and have upper and lower gudgeons 12, which obtain bearings in the bottom and top of the casing.

The gear-wheels bearing the cutters are differently formed in order to provide for the overlapping of the cutters. The intermediate gear-wheels have their middle portion raised a distance corresponding to the thickness of the cutters, whereby a space is formed between the cutters affixed to the raised portion and the marginal portion of the gear-wheel surrounding the raised part to which the cutter is applied. The cutters secured to the top side of the gear-wheels adjacent to the gear-wheels, having their middle portion raised, have their edge portion operating in the said space, as indicated most clearly in Fig. 3. The gear-wheels may be spaced apart any required distance and connected in any of the usual ways so as to rotate in unison.

The series of gear-wheels are located within the casing and are concealed and protected thereby, and the primary gear-wheel 9 has its upper edge portion made rounding, so as to maintain meshing relation with the contiguous gear-wheel when moving the free end of the part 7 up or down. Guard-fingers 13 project from the front edge of the casing and coöperate with the rotary cutters when the apparatus is in operation. Grain-dividers 14 are at or near the ends of the casing for the ordinary purpose of devices of this character. The casing is closed at its top by a plate or cover 15, which is secured thereto in any manner, preferably by bolts 16, which pass through openings in the gudgeons 12 and have their heads and clamp-nuts overlapping portions of the bottom and top of the casing, as clearly indicated. A lip 17 projects from the inner end of the part 6 beyond the sides thereof, so as to come beneath the bottom of the outer part 7 and hold the two parts of the casing in alinement. The sides of the outer part 7 project beyond the inner end of the bottom and overlap the sides of the part 6, to which they are pivoted, thereby admitting of the part 7 turning in the manner and for the purpose aforesaid.

A chain 19 connects the inner part 6 of the casing with the tongue 3 and braces the casing and maintains it and the tongue at a fixed relative distance apart. A second chain 18 is secured at its lower end to the inner end of the casing and at its upper end to a lever 20, by means of which the cutting apparatus may be raised or lowered at will, and this lever has the usual hand-latch 21 to coöperate with a notched segment 22 to hold it and the cutting apparatus at the required elevation.

By having a gear-wheel at the lower front end of the shaft 5 intermeshing with the teeth of the primary gear 9 a pitman connection is obviated, the draft lightened, and the mechanism caused to run smoother and more steady, as will be readily understood.

Having thus described the invention, what is claimed as new is—

1. In cutting apparatus for mowers, the combination of an inner casing mounted upon a rolling support, an outer casing pivoted to the inner casing and provided at its outer end with a rolling support, a cutting mechanism applied to the outer casing and having an inner gear-wheel, a primary gear-wheel journaled to the inner casing and having its axis in transverse alinement with the axis of the gear-wheel meshing therewith, and having edge and top gearing formed on the arc of a circle having the pivotal connection between the two casings for its center, and means for imparting motion to the said primary gear-wheel, substantially as described.

2. In cutting apparatus for mowers, the combination of an inner casing having vertical sides and an outwardly-extending lip at its bottom, an outer casing having its sides extended and pivoted to the sides of the inner casing and limited in its downward movement by engaging with the said lip thereof, a top plate closing the outer casing, gear-wheels having upper and lower tubular gudgeons journaled in the top and bottom of the outer casing, bolts passing through the said tubular gudgeons and connecting upper and lower parts of the outer casing, overlapping cutters secured to the gear-wheels, and a primary gear-wheel alining transversely with the cutter gear-wheels and having an edge and top gearing formed on the arc of a circle having the pivotal connection between the two casings as a center, substantially as set forth.

In testimony that I claim the foregoing as my own I have hereto affixed my signature in the presence of two witnesses.

ALBERT PALM.

Witnesses:
JOHN R. RENNER,
WILLIAM NEITZKE.